(12) United States Patent
Zhou et al.

(10) Patent No.: US 12,235,231 B2
(45) Date of Patent: Feb. 25, 2025

(54) LASER HEATING SINGLE-SENSOR FAST SCANNING CALORIMETER

(71) Applicants: SHEYANG RESEARCH INSTITUTE OF NANJING UNIVERSITY, Jiangsu (CN); NANJING UNIVERSITY, Jiangsu (CN)

(72) Inventors: Dongshan Zhou, Jiangsu (CN); Evgeny Zhuravlev, Jiangsu (CN); Jing Jiang, Jiangsu (CN); Qi Xue, Jiangsu (CN); Shaochuan Luo, Jiangsu (CN); Xiaoliang Wang, Jiangsu (CN); Wei Jiang, Jiangsu (CN); Qing Ji, Jiangsu (CN)

(73) Assignees: SHEYANG RESEARCH INSTITUTE OF NANJING UNIVERSITY, Jiangsu (CN); NANJING UNIVERSITY, Jiangsu (CN)

( * ) Notice: Subject to any disclaimer, the term of this patent is extended or adjusted under 35 U.S.C. 154(b) by 517 days.

(21) Appl. No.: 17/773,042

(22) PCT Filed: Dec. 5, 2019

(86) PCT No.: PCT/CN2019/123148
§ 371 (c)(1),
(2) Date: Apr. 29, 2022

(87) PCT Pub. No.: WO2021/097932
PCT Pub. Date: May 27, 2021

(65) Prior Publication Data
US 2022/0390398 A1  Dec. 8, 2022

(30) Foreign Application Priority Data

Nov. 20, 2019 (CN) .......................... 201911140788.5
Nov. 20, 2019 (CN) .......................... 201922015753.0

(51) Int. Cl.
*G01N 25/20* (2006.01)
*B23K 26/50* (2014.01)
(Continued)

(52) U.S. Cl.
CPC ............. *G01N 25/20* (2013.01); *B23K 26/50* (2015.10); *G01K 17/006* (2013.01); *G01K 17/04* (2013.01);
(Continued)

(58) Field of Classification Search
CPC ...... G01K 17/00; G01K 17/006; G01K 17/04; B23K 26/50; G01N 25/20; G01N 25/48;
(Continued)

(56) References Cited

U.S. PATENT DOCUMENTS

2013/0248504 A1* 9/2013 Kusuda ............ H01L 21/67115
219/121.85
2014/0301424 A1* 10/2014 Adamczyk ............. G01N 25/20
374/44
(Continued)

FOREIGN PATENT DOCUMENTS

CN    103743775    4/2014
CN    107271479    10/2017
(Continued)

OTHER PUBLICATIONS

Computer translation of CN 103743775 downloaded Nov. 14, 2024.*
(Continued)

*Primary Examiner* — Randy W Gibson
(74) *Attorney, Agent, or Firm* — JCIPRNET

(57) ABSTRACT

The present invention discloses a laser heating single-sensor fast scanning calorimeter, which comprises an FSC sample chamber, a chip sensor positioned in the FSC sample chamber and used for loading a sample, a laser heater for heating
(Continued)

the sample, an infrared camera for shooting a sample image, a communication terminal and a control electronic element, wherein a perspective window serving as a light path channel is arranged in a center of the FSC sample chamber, and the laser heater and the infrared camera are positioned at the top of the perspective window; the infrared camera is connected with the communication terminal; one end of the control electronic element is connected with the communication terminal, and the other end of the control electronic element is connected with the laser heater and the chip sensor.

7 Claims, 6 Drawing Sheets

(51) Int. Cl.
    *G01K 17/00*     (2006.01)
    *G01K 17/04*     (2006.01)
    *G01N 25/48*     (2006.01)

(52) U.S. Cl.
    CPC ....... *G01N 25/4846* (2013.01); *G01N 25/486* (2013.01)

(58) Field of Classification Search
    CPC ............. G01N 25/486; G01N 25/4846; G01N 25/4853
    See application file for complete search history.

(56) References Cited

U.S. PATENT DOCUMENTS

2016/0238465 A1* 8/2016 Zhou .................... G01K 17/006
2017/0016839 A1* 1/2017 Rubenchik ............. G01N 25/20

FOREIGN PATENT DOCUMENTS

| CN | 107884259 | 4/2018 |
| CN | 107941850 | 4/2018 |
| CN | 109900738 | 6/2019 |
| CN | 110823943 | 2/2020 |
| WO | 2009149333 | 12/2009 |

OTHER PUBLICATIONS

Computer translation of CN 107941850 downloaded Nov. 14, 2024.*
Computer translation of CN 10990073 downloaded Nov. 14, 2024.*
Computer translation of CN 110823943 downloaded Nov. 14, 2024.*
"International Search Report (Form PCT/ISA/210) of PCT/CN2019/123148," mailed on Aug. 26, 2020, with English translation thereof, pp. 1-4.

\* cited by examiner

LASER HEATING SINGLE-SENSOR FAST SCANNING CALORIMETER

CROSS-REFERENCE TO RELATED APPLICATION

This application is a 371 of international application of PCT application serial no. PCT/CN2019/123148, filed on Dec. 5, 2019, which claims the priority benefits of China application no. 201911140788.5, filed on Nov. 20, 2019 and China application no. 201922015753.0, filed on Nov. 20, 2019. The entirety of each of the above-mentioned patent applications is hereby incorporated by reference herein and made a part of this specification.

TECHNICAL FIELD

The present invention belongs to the field of detection equipment, and particularly relates to a laser heating single-sensor fast scanning calorimeter.

RELATED ART

A fast scanning calorimeter (FSC) can be used for researching on the temperature rising and dropping scanning calorimetry of up to $10^6$ K/s on a micron-sized sample by using a nano-micron-sized thin film chip sensor, and can perform high-sensitivity detection and regulation on the temperature of the sample through a heater and a thermopile that are arranged in a sensor thin film. However, there is still significant thermal resistance between the sample and the heater; at present, the thermal contact between the sample and the heater is improved mainly by pre-melting sample or using heat-conductive glue/oil, and the like, but the methods are not applicable to all samples. In addition, the internal heater can heat a sensor around the sample, which causes energy loss, and increases the additional heat capacity of the system. It is possible, by using laser heating instead of the heating of a heater inside a sensor, to provide heat input to the sample as directly as possible, avoiding a thermal lag between the sensor heater and the sample, and greatly reducing the additional heat capacity of the sensor electronic element. Although there is still the thermal resistance between the sample and the thermopile, the sample, by using laser heating, may be placed directly above the thermopile and the coupling between the sample and the thermopile may be increased to a maximum, thereby reducing a number of thermopiles required to obtain an accurate thermal signal, for example, a smaller sample may be detected using a single thermopile sensor.

The combination of the laser heating and fast scanning calorimeter can simulate the laser melting process of additive manufacturing industry, and simulating the heating and curing processes of printing materials in the 3D printing process in experiments provides industrial production with parameter reference and material performance characterization and screening. However, the combination of the laser heating and the fast scanning calorimetry is limited to auxiliary heating by using a laser, and has not controllable heating, and a temperature jump experiment is mainly performed on a heated sample by using laser pulses. A PID control system with a frequency of above 100 kHz is required to achieve fast and controllable laser heating, as well as more accurate laser aiming to avoid heating of areas outside the sample (including sensor heaters, thermopiles and the like).

SUMMARY OF INVENTION

Objective: Aiming at a requirement for an improved upgrade to a fast scanning calorimeter (FSC), the present invention uses laser heating to completely replace a heater inside a sensor of a conventional FSC, which can provide the most direct heat input. The focused heat input can heat a sample most quickly, avoids thermal delays between the heater and the sample, and achieves faster cooling after heating is turned off.

For the above objective, the present invention adopts technical schemes as follows.

A laser heating single-sensor fast scanning calorimeter comprises: an FSC sample chamber, a chip sensor positioned in the FSC sample chamber and used for loading a sample, a laser heater for heating the sample, an infrared camera for shooting a sample image, a communication terminal and a control electronic element;

a perspective window serving as a light path channel is arranged in a center of the FSC sample chamber, and the laser heater and the infrared camera are positioned at the top of the perspective window and can align with the sample in the FSC sample chamber; and the infrared camera is connected with the communication terminal, and a shot picture is sent to the communication terminal through infrared imaging; one end of the control electronic element is connected with the communication terminal, and the other end of the control electronic element is connected with the laser heater and the chip sensor.

The communication terminal receives an infrared imaging picture shot by the infrared camera, and assists the laser heater to focus and accurately aim at the sample for heating; the control electronic element controls the heating power of the laser heater on one hand, and obtains the sample temperature information fed back by the chip sensor in real time on the other hand, so as to provide information for adjusting the heating power of the laser heater in the next step.

Specifically, a PID temperature controller for outputting heating power to the laser heater and a data acquisition card for recording real-time temperature values of the sample fed back by the chip sensor are arranged inside the control electronic element;

one end of the PID temperature controller is connected with the communication terminal, and the other end of the PID temperature controller is connected with the laser heater, which is used for sending heating power information of the laser heater to the PID temperature controller through a communication terminal control page;

one end of the data acquisition card is connected with the chip sensor; the other end of the data acquisition card is connected with the communication terminal, and the data acquisition card receives the real-time temperature values of the sample fed back by the chip sensor, stores the real-time temperature values and sends the real-time temperature values to the communication terminal so as to provide information for adjusting the heating power of the laser heater in the next step.

Specifically, the FSC sample chamber comprises a sealed cavity, a hot and cold stage positioned within the sealed cavity, and a PCB contact plate;

the chip sensor is positioned above the hot and cold stage, the PCB contact plate is pressed on the chip sensor through an embedded metal pin, and signal transmission is performed between the PCB contact plate and an FSC outside the sample chamber through a lead;

a light path channel is reserved in centers of the hot and cold stage, the chip sensor and the PCB contact plate and corresponds to the perspective window;

one end of the hot and cold stage is connected with a cold source outside the sample chamber through a pipeline, and the other end of the hot and cold stage is connected with an environment control device outside the sample chamber through a lead; and a gas inlet and a gas outlet are reserved on two sides of the sealed cavity, respectively.

Specifically, a heater and a thermopile are arranged inside the chip sensor.

Further, in order to avoid the chip sensor from being mechanically vibrated by the laser heater to generate noise, a laser beam guide such as an optical fiber may be used.

Further, the infrared camera is equipped with a microscope lens.

The present invention also provides a method for laser heating with the laser heating single-sensor fast scanning calorimeter, which comprises:

(1) installing the FSC sample room, the laser heater the infrared camera, the communication terminal and the control electronic element;

(2) placing an infrared display card at a sample loading position of the chip sensor in the FSC sample chamber, starting the laser heater for laser radiation, observing a laser heating position through the infrared camera and adjusting laser focusing until a laser point is brightest;

(3) removing the infrared display card, loading a sample to be detected on the chip sensor, starting the laser heater to for laser radiation, finely adjusting a position of the sample according to a diameter and a thickness of the sample, and completing laser position adjustment and laser focusing; and (4) editing a required heat treatment process through the communication terminal, sending a temperature-time curve to the control electronic element in a voltage vs time form, driving, by the control electronic element, the laser heater to output heating power according to a voltage vs time signal, meanwhile, receiving, by the control electronic element, the sample real-time temperature values fed back by the chip sensor, and saving and sending the sample real-time temperature values to the communication terminal to be compared with a set temperature.

Beneficial Effects

The fast scanning calorimeter of the present invention adopts the laser heater to perform completely controllable fast heating on a sample for the first time, and uses the infrared camera to assist laser aiming, thereby avoiding heating an area around the sample; compared with a heater of a conventional sensor, the laser heater of the fast scanning calorimeter can provide the most direct heat input; the focused heat input can heat a sample most quickly, avoid a thermal lag between the sensor heater and the sample, and have a higher temperature control response rate, thereby realizing faster temperature rising and dropping scanning.

BRIEF DESCRIPTION OF DRAWINGS

The foregoing and/or other advantages of the present invention will become more apparent from the following detailed description of the present invention with reference to the drawings and specific embodiments.

Figure 1:
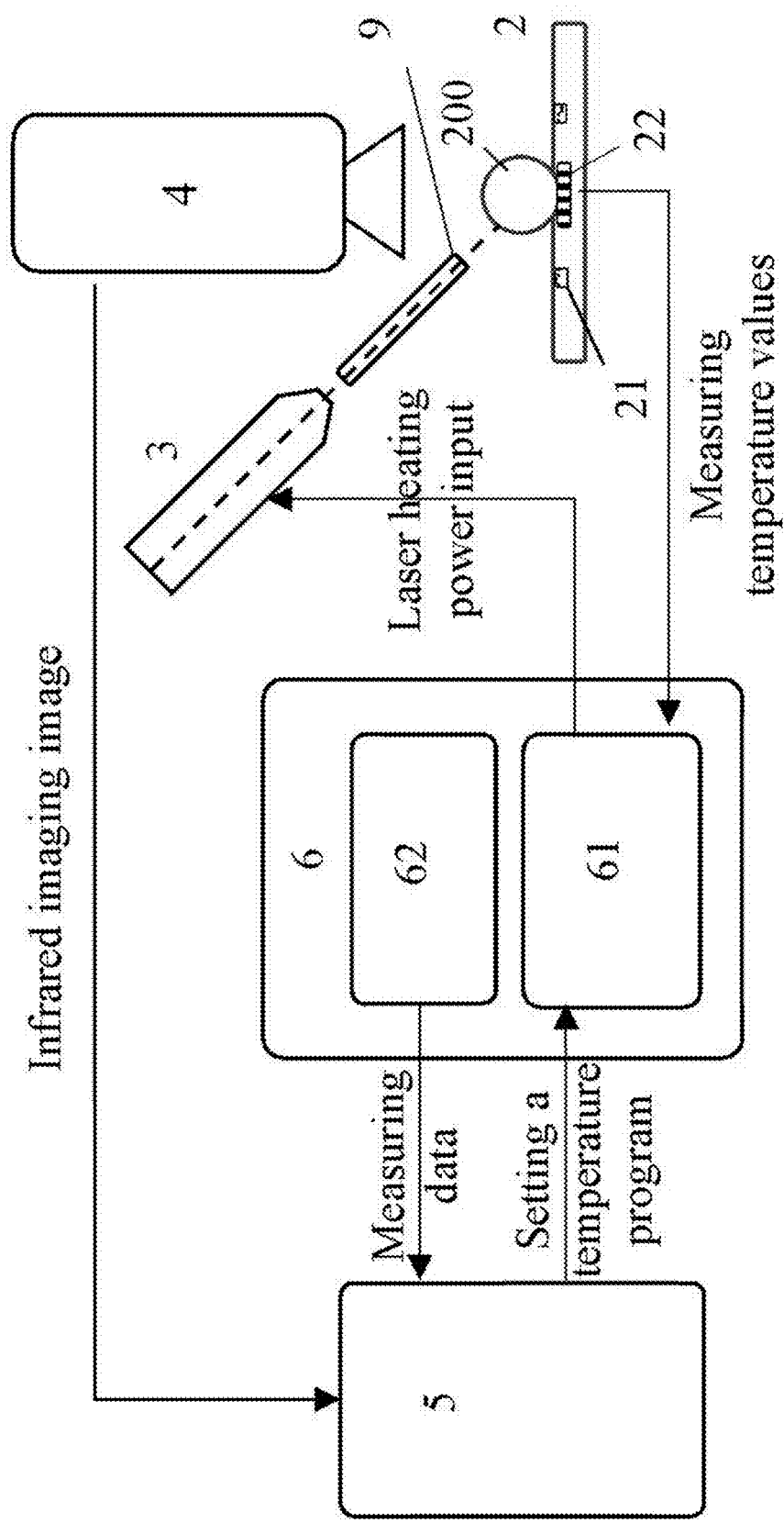
FIG. 1 is a schematic diagram of an overall structure of the laser heating fast scanning calorimeter according to the present invention.

The reference numerals in the drawings have following meanings: 1 represents an FSC sample chamber; 101 represents a sealed cavity; 102 represents a perspective window; 103 represents a hot and cold stage; 104 represents a PCB contact plate; 105 represents a metal pin; 106 represents an FSC; 107 represents an environment control device; 108 represents a gas inlet; 109 represents a gas outlet; 2 represents a chip sensor; 21 represents a heater; 22 represents a thermopile; 3 represents a laser heater; 31 represents a laser beam guide; 4 represents an infrared camera; 5 represents a communication terminal; 6 represents a control electronic element; 61 represents a PID temperature controller; 62 represents a data acquisition card; 200 represents a sample.

DESCRIPTION OF EMBODIMENTS

The present invention will be better understood from the following embodiments.

The structures, proportions, dimensions and the like shown in the drawings in the specification are only used to cooperate with the contents disclosed in the specification, so as to be understood and read by those skilled in the art, and are not used to limit the conditions for the implementation of the present invention; therefore, it has no technical significance. Any structural modifications, changes in proportions, or adjustments in size, which do not affect the efficacy and attainment of the present invention, are intended to fall within the scope of the present invention. Meanwhile, terms such as "upper", "lower", "front", "rear" and "middle" used in the present specification are used for clarity of description only, and are not used to limit the scope of the present invention, and the relative relationship changes or adjustments may be considered as the scope of the present invention without substantial changes in the technical content.

Figure 2:
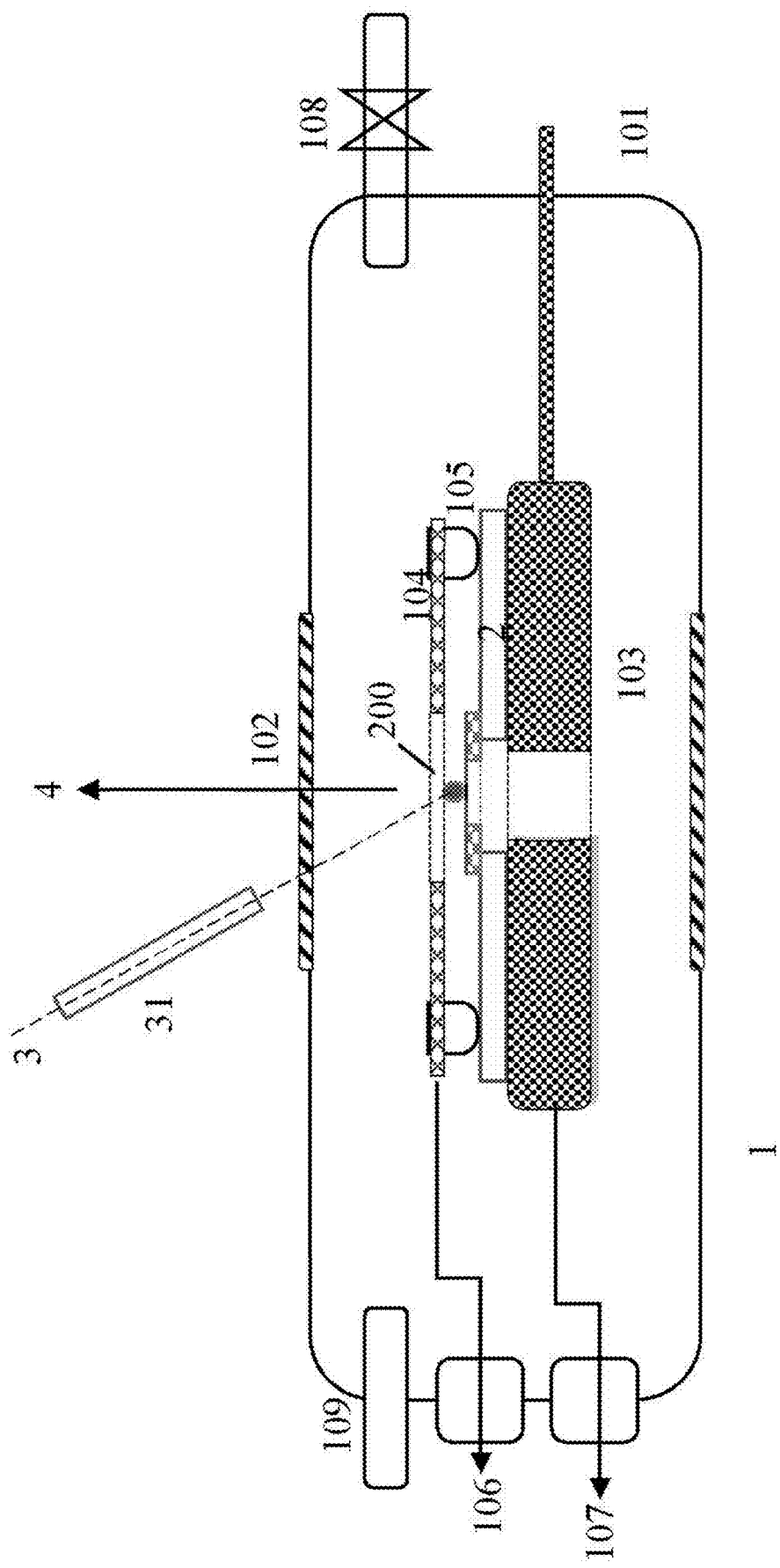
FIG. 2 is a schematic diagram of a structure of the sample chamber of the laser heating fast scanning calorimeter according to the present invention.

As shown in FIG. 1 and FIG. 2, the fast scanning calorimeter of the present invention comprises: an FSC sample chamber 1, a chip sensor 2 positioned in the FSC sample chamber 1 and used for loading a sample 200, a laser heater 3 for heating the sample, an infrared camera 4 for shooting a sample image, a communication terminal 5 and a control electronic element 6.

A perspective window 102 serving as a light path channel is arranged in a center of the FSC sample chamber 1, and the laser heater 3 and the infrared camera 4 are positioned at the top of the perspective window 102 and can align with the sample 200 in the FSC sample chamber 1.

The infrared camera 4 is connected with the communication terminal 5, and a shot picture is sent to the communication terminal 5 through infrared imaging; one end of the control electronic element 6 is connected with the communication terminal 5, and the other end of the control electronic element is connected with the laser heater 3 and the chip sensor 2. A PID temperature controller 61 for outputting heating power to the laser heater 3 and a data acquisition card 62 for recording real-time temperature values of the sample fed back by the chip sensor 2 are arranged inside the control electronic element 6.

One end of the PID temperature controller 61 is connected with the communication terminal 5, and the other end of the PID temperature controller is connected with the laser heater 3, which is used for sending heating power information of the laser heater to the PID temperature controller through a communication terminal control page;

one end of the data acquisition card 62 is connected with the chip sensor 2; the other end of the data acquisition card is connected with the communication terminal 5, and the data acquisition card receives the real-time temperature values of the sample fed back by the chip sensor, stores the real-time temperature values and sends the real-time temperature values to the communication terminal so as to provide information for adjusting the heating power of the laser heater in the next step.

The FSC sample chamber 1 comprises a sealed cavity 101, a hot and cold stage 103 and a PCB contact plate 104, wherein the hot and cold stage 103 is positioned in the sealed cavity body 101; the chip sensor 2 is positioned above the hot and cold stage 103, the PCB contact plate 104 is pressed on the chip sensor 2 through an embedded metal pin 105, and signal transmission is performed between the PCB contact plate and an FSC 106 outside the sample chamber through a lead; a light path channel is reserved in centers of the hot and cold stage 103, the chip sensor 2 and the PCB contact plate 104 and corresponds to the perspective window 102.

One end of the hot and cold stage 103 is connected with a cold source outside the sample chamber through a pipeline, and the other end of the hot and cold stage is connected with an environment control device 107 outside the sample chamber through a lead; a gas inlet 108 and a gas outlet 109 are reserved on two sides of the sealed cavity 101, respectively; different atmospheres or gas purging is used from the gas inlet and the gas outlet according to different use requirements, and in order to avoid sample temperature fluctuation caused by airflow turbulence, a molecular valve or other gas valves which can be used for ultra-slow airflow fine adjustment can be used.

The chip sensors 2 can be all chip sensors (XEN 393, xenon Integration) available for fast scanning calorimeter containing a thermocouple. The chip sensor has a silicon nitride thin film containing a heater 21 for additional fast scanning calorimetry and a thermopile 22 providing a temperature signal in volts for controlling and recording the temperature of the sample. The sample is placed on the heater and thermopile and the sample may be any spheroidal particle with a diameter of 1-500 μm, for example, the International Organization for Standardization (ISO) recommends powder particles (with a diameter of 20-200 μm) for additive manufacturing are ideally applicable to the present invention. In order to achieve faster temperature control, small particle samples are preferred to avoid a thermal lag inside the sample. Unlike conventional fast calorimeters where the heater inside the sensor is not used for sample heating, the modular structure of the present invention allows for the fast re-coupling of the internal heater into a single sensor, even a differential fast scanning calorimetry setup so as to simulate a laser heating process, which facilitates the quantitative measurement of actual heat flow.

The method for using the fast scanning calorimeter is as follows: loading the sample 200 on the chip sensor 2, turning on the laser heater 3, and observing the temperature of the sample through the infrared camera 4 so as to adjust the aiming focus of the laser; setting a required temperature program (a temperature-time curve) on a user interface of the communication terminal 5 and sending the temperature curve to the control electronic element 6 (a National Instruments usb6365 data acquisition card, a SRS SIM960 PID controller), wherein the PID temperature controller 61 for outputting heating power to the laser heater 3 and the data acquisition card 62 for recording the real-time temperature values of the sample fed back by the chip sensor 2 are arranged inside the control electronic element 6; outputting, by the PID temperature controller 61, heating power to the laser heater 3 according to the received set values, receiving, by the data acquisition card 62, the real-time temperature values of the sample fed back by the thermopile 22 in the chip sensor 2, storing and transmitting the real-time temperature values to the communication terminal 5, so as to provide information for adjusting the heating power of the laser heater 3 in the next step.

In the laser heating process, only the temperature values of the sample is recorded and the specific absorbed heat values of the sample cannot be measured, so that the temperature program can be repeated by using the heater 21 inside the chip sensor 2 to perform a fast scanning calorimetry experiment, and the change of heat flow when the same temperature change of the sample is realized is recorded, thereby calculating the change of physical parameters such as heat capacity.

The power of the laser heater 3 (an MXL-III-880 infrared laser available from Changchun New Industries Optoelectronics Technology Co., Ltd.) is adjusted by the PID temperature controller 61 to adjust the input voltage values, and the laser heater adjusts the corresponding output power according to the input voltage. The infrared camera 4 (a FLIR SC7000 infrared camera with a 7 times microscope lens) is used for observing the temperature change of the sample, and the laser aiming is determined according to the heating of the sample. If an ultra-fast infrared imaging camera (with a frame rate of 10 kHz) is used, the temperature of the sample in the laser heating experiment can be recorded at the same time and compared with the temperature values fed back by the sensor thermopile 22.

The user interface on the communication terminal (a PC/a laptop/a tablet or the like) edits the required heat treatment process (temperature vs time), and the temperature-time curve will be provided to the control electronic element of the device in the form of voltage vs time. The control electronic element modulates the power of the laser through the PID temperature controller, and sets a PID output setting according to the voltage input range of the laser heater. For example, the input voltage to the laser heater is 0-1 V (corresponding to a laser power from 0-100%), and the PID output is set from 0 to 1. The user can change the PID setting values according to different lasers. The control electronic element outputs voltage to the laser according to an experimental program, the laser heats the sample, the thermopile on the chip sensor measures temperature and feeds the temperature back to the control electronic element according to voltage values, when the voltage of the thermopile is higher or lower than set values, the PID controller of the control electronic element correspondingly adjusts a driving voltage of the laser to complete a set temperature-time curve, the data acquisition card records the temperature change of the sample in the experimental process, and the data are sent to the communication terminal for storage and further analysis. In order to achieve fast temperature control, the control electronic element requires electronics with extremely high response rates and with a minimum bandwidth of 100 kHz.

The user interface is programmed using Labview software, has been widely used in existing FSC equipment, and has been improved according to the use condition. The purchased commercial laser heater has a laser controller to input voltage values to control the output power of the laser; it is only necessary to connect the laser controller to the control electronic element of the present invention and apply a certain voltage to control the output power of the laser for heating. The present invention mainly uses a laser heater (replacing a heater inside the chip sensor) to heat the sample; according to the sample temperature signal fed back by the thermopile voltage, the PID controller is used for fast regulation and feedback of the laser heater, so as to realize fast and controllable programmed heating.

In order to avoid the chip sensor from being mechanically vibrated by the laser to generate noise, a laser beam guide such as an optical fiber (a CNI polarization-maintaining fiber) may be used. Fixing the optical fiber to the sample chamber may reduce the wobble of the laser beam on the sample with a corresponding reduction in interference with the calorimetric signal. The laser beam guide is only applicable to certain types of lasers and requires the addition of a light focusing element after the guide.

Focusing the laser directly on the sample can provide maximum heat to the sample and avoid heating surrounding sensor elements. The laser aiming and focusing can be assisted by an infrared imaging camera. The specific experimental steps are as follows: firstly, placing an infrared display card under an infrared camera and performing laser radiation, observing a laser heating position through the infrared camera and adjusting laser focusing (adjusting a laser focusing lens) until a laser spot is brightest (a diameter of the laser spot is about 8 µm); and placing a sample (with a diameter of about 15 µm) at the position of the infrared display card, raising the temperature of the sample by laser radiation, finely adjusting a position of the sample (fine adjusting a microscope stage) according to a diameter and a thickness of the sample, positioning a focused laser point at the center of the sample, and completing laser position adjustment and laser focusing. In addition, infrared imaging records the temperature of the sample, and the thermopile on the sensor also measures the internal temperature of the sample, so that comparison between the two temperatures can be performed. The infrared thermal imager can detect thermal radiation at about a sensor area of $100 \times 100$ µm$^2$ at corresponding magnifications. If the temperatures of the sample particles and the sensor are required to be recorded in real time during the experiment, an infrared imaging camera with a high frame rate and high sensitivity is required, e.g., it takes about 7 ms to heat up from room temperature to 1000 K at a rate of 100,000 K/s, and obtaining at least 1 frame of data per 10 K requires an infrared imaging camera with a frame rate of at least 10 kHz.

In a conventional fast scanning calorimeter, the heater of the sensor is placed in the thin film, so that there is a significant thermal resistance between the sample and the heater, and the heater also heats the sensor around the sample at the same time. Laser heating can then provide energy as directly as possible to the sample by focusing and appropriate aiming, thereby avoiding the thermal lag between the sensor heater and the sample. In addition, laser heating can also avoid coupling of the sensor heater to the thermopile. The thermal resistance between the sample and the thermopile is still present and there is no way to remotely measure the sample temperature faster and more accurately. However, the sample, by using laser heating, may be placed directly above the thermopile and the coupling between the sample and the thermopile may be increased to a maximum possible, thereby reducing a number of thermopiles required to obtain an accurate thermal signal, for example, a smaller sample may be detected using a single thermopile sensor. Fast temperature control allows any linear, nonlinear temperature-time thermal processing procedure up to 1,000,000 K/s or faster to be performed.

The temperature of the thermopile will be recorded during performing a user-set temperature curve, and when an endothermic or exothermic phase transition occurs, the temperature of the sample will deviate from the set values due to latent heat to show a corresponding endothermic or exothermic peak, indicating the melting or crystallization process occurring in the sample. The information is important in the fields of additive manufacturing, basic theory research and industrial application research requiring fast heat treatment. The fast scanning calorimeter can quantitatively analyze the change of heat flow in the sample, and after a laser heating experiment, the heater inside the sensor can be used for repeating the experiment to obtain quantitative heat flow data so as to analyze heat capacity. In cooperation with a fast infrared imaging camera, the temperature of the sample under the same condition can be provided and compared with the temperature data measured by the thermopile.

Laser pulses have been used to heat the sample and record a temperature to which the sample is heated by a thermocouple, but the heating process is not controllable. The sample temperature is recorded after the laser pulses are fired. The present invention feeds the temperature measured by the thermocouple back to the laser controller for the first time, and correspondingly adjusts the laser power in real time and rapidly, so that the laser heating is completely controllable. A speed of receiving and adjusting the signals is very fast, the following experiment results show that a controllable fast temperature heating and dropping program can be realized, the thermal lag is eliminated, and the temperature regulation response rate and the controllable temperature rising and dropping rate are improved by one order of magnitude. Meanwhile, independent laser heating cannot obtain equivalent thermal physical information of heat flow and heat capacity, the present invention can be switched at any time between laser heating and the heating of a heater inside a conventional FSC, and the FSC is used for repeating a temperature vs time program recorded during laser heating, so that data of heat flow, heat capacity and the like with physical significance can be obtained. In addition, compared with a convention FSC using two sensors (reference and sample sensors), the laser heating single-sensor fast scanning calorimeters use a single sensor to achieve higher scanning rates.

Figure 3A:
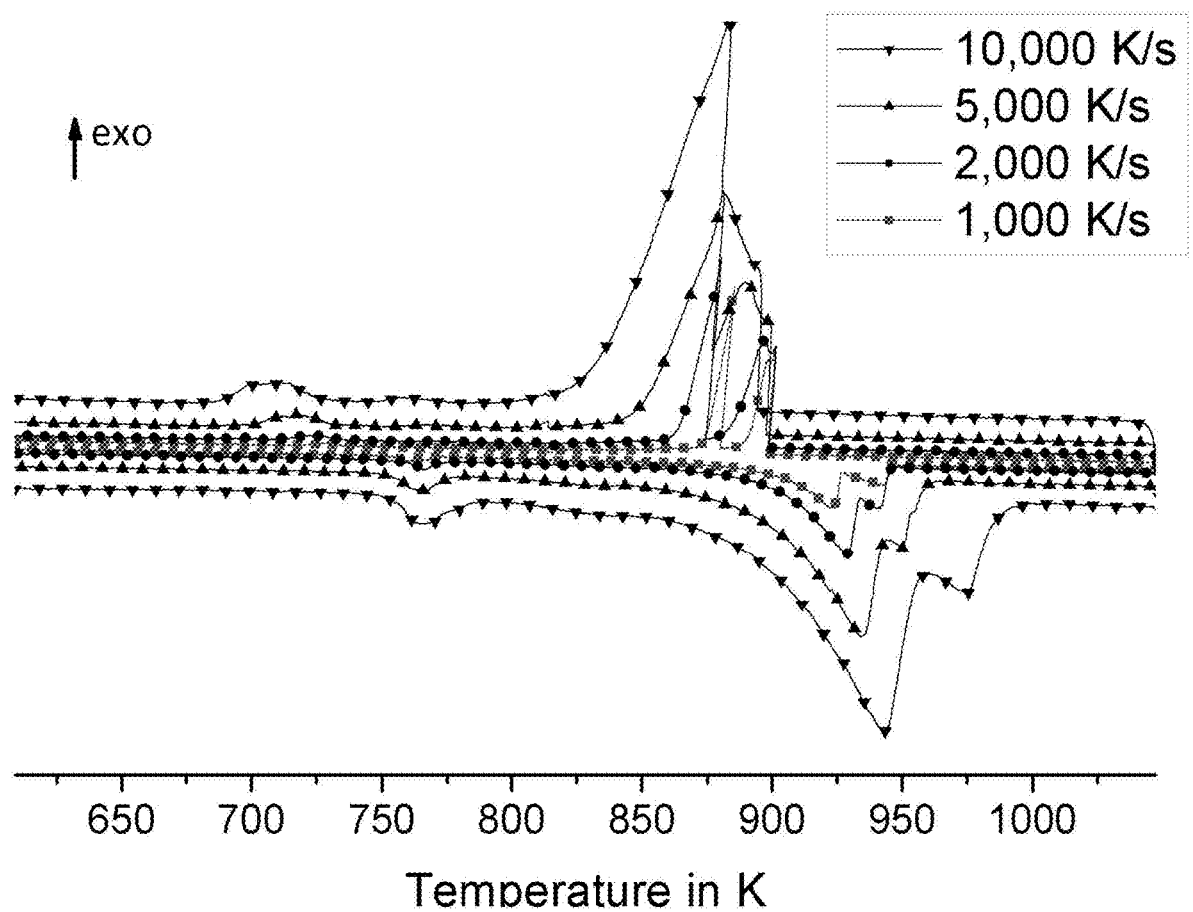
FIG. 3A is a graph of the melting and curing processes of Al7075 particles as observed by a conventional fast scanning calorimeter.
Figure 3B:
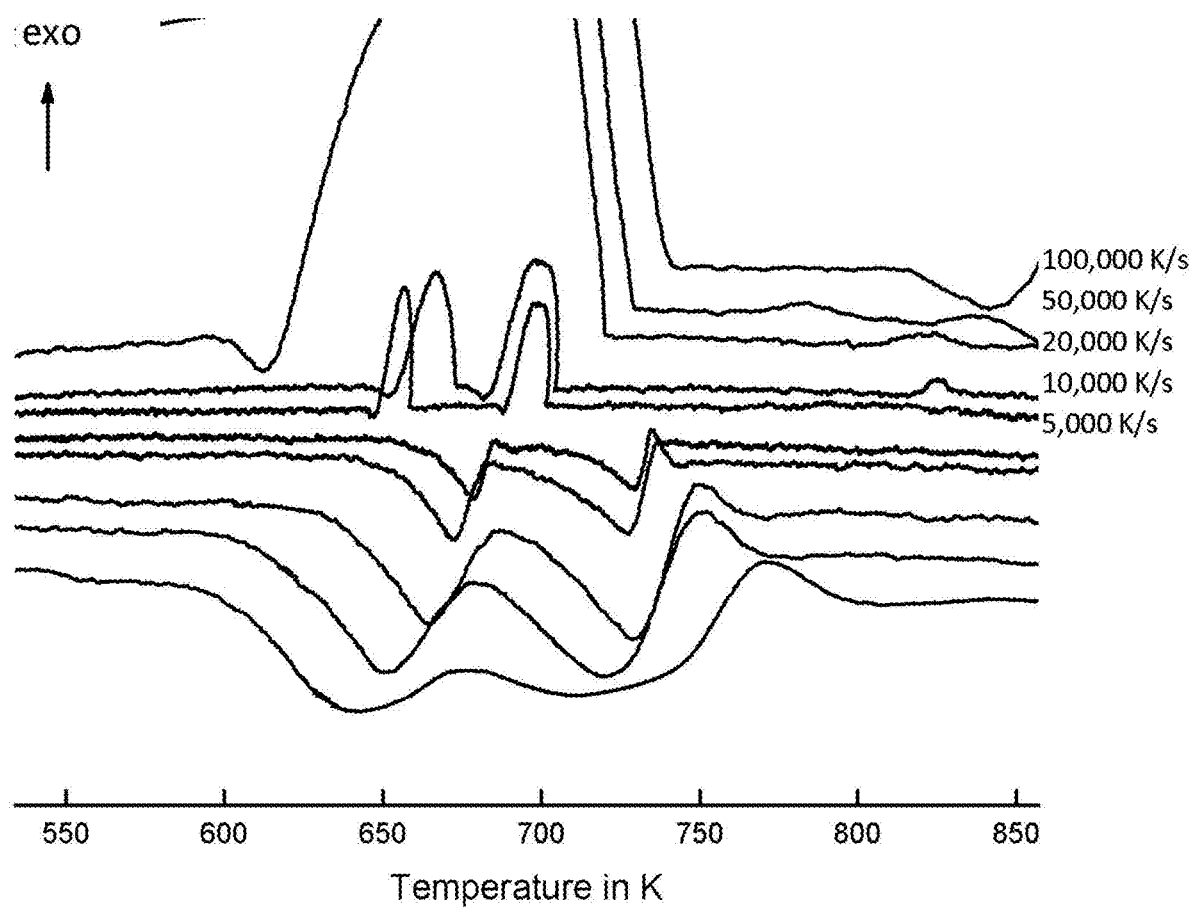
FIG. 3B is a graph of the melting and curing processes of Al7075 particles as observed by the laser heating fast scanning calorimeter according to the present invention.

FIGS. 3A and 3B show the melting and crystallization processes of two adjacent Al7075 particles observed by a conventional fast scanning calorimeter and the laser heating calorimeter of the present invention, respectively. The temperature rising and dropping experiment is performed on the sample at different scanning rates (conventional internal sensor heating and controllable laser heating), the melting peak and the crystallization peak of the sample are observed, and the result shows that 1) the laser heating fast scanning calorimeter can realize controllable fast scanning, and the highest scanning rate (such as 100,000 K/s in FIG. 3B) of the laser heating fast scanning calorimeter can be higher than that of the conventional fast scanning calorimeter (10,000 K/s in FIG. 3A) by one order of magnitude; 2) when the conventional internal sensor performs heating, a melting peak of the sample moves to a high temperature along with a rise of a scanning rate, which indicates that an obvious thermal lag exists between the sample and the heater, and in a laser heating experiment, the melting peak moves to a low temperature along with the rise of the scanning rate, and a crystallization peak moves to a high temperature along with the rise of the scanning rate, which indicates that the temperature of the sample can be ensured to be higher than that of the sensor by laser heating, so that the thermal lag between the sample and the heater is avoided, and a more accurate thermal analysis result is obtained.

Figure 4A:
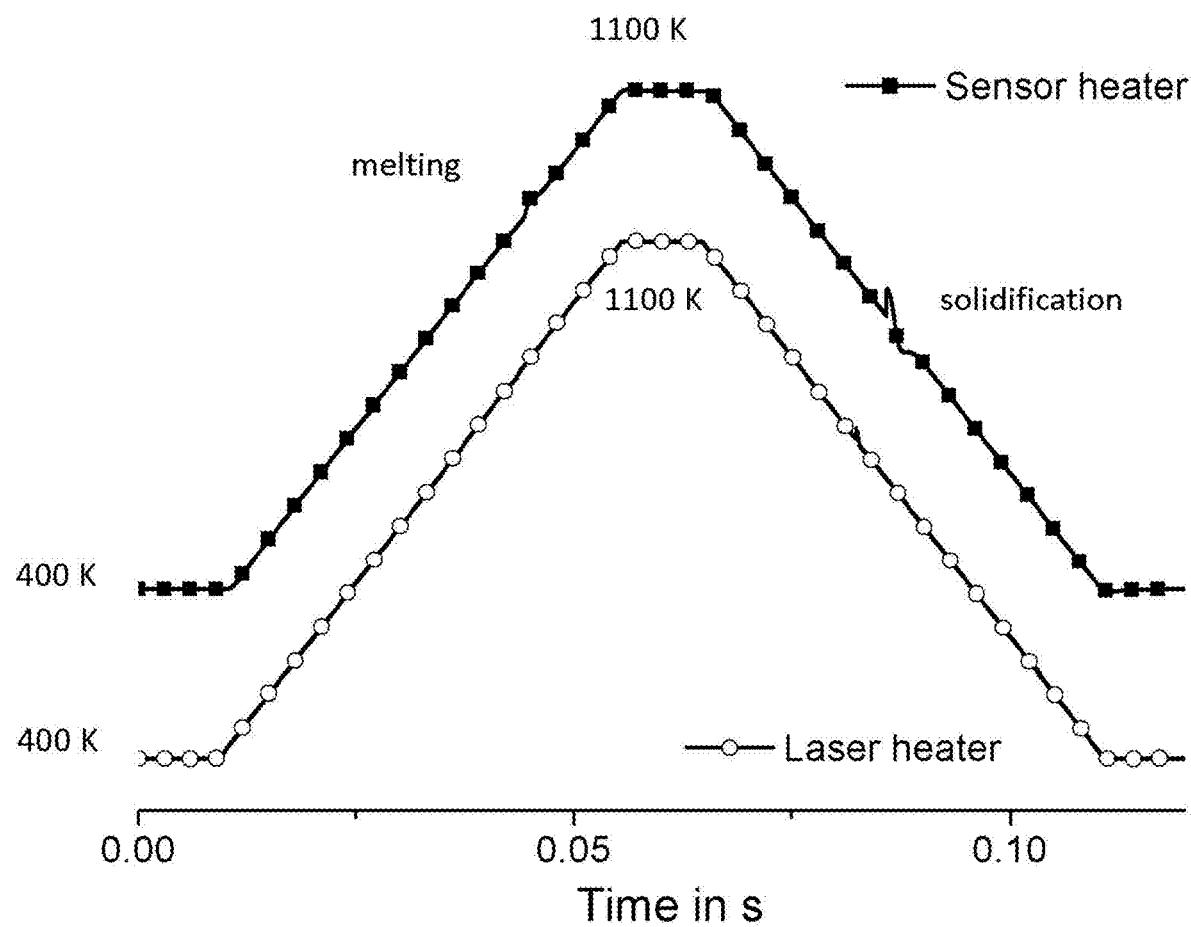
FIG. 4A is a real-time measured temperature vs time curve of the laser heating fast scanning calorimeter and a heater arranged in the sensor.
Figure 4B:
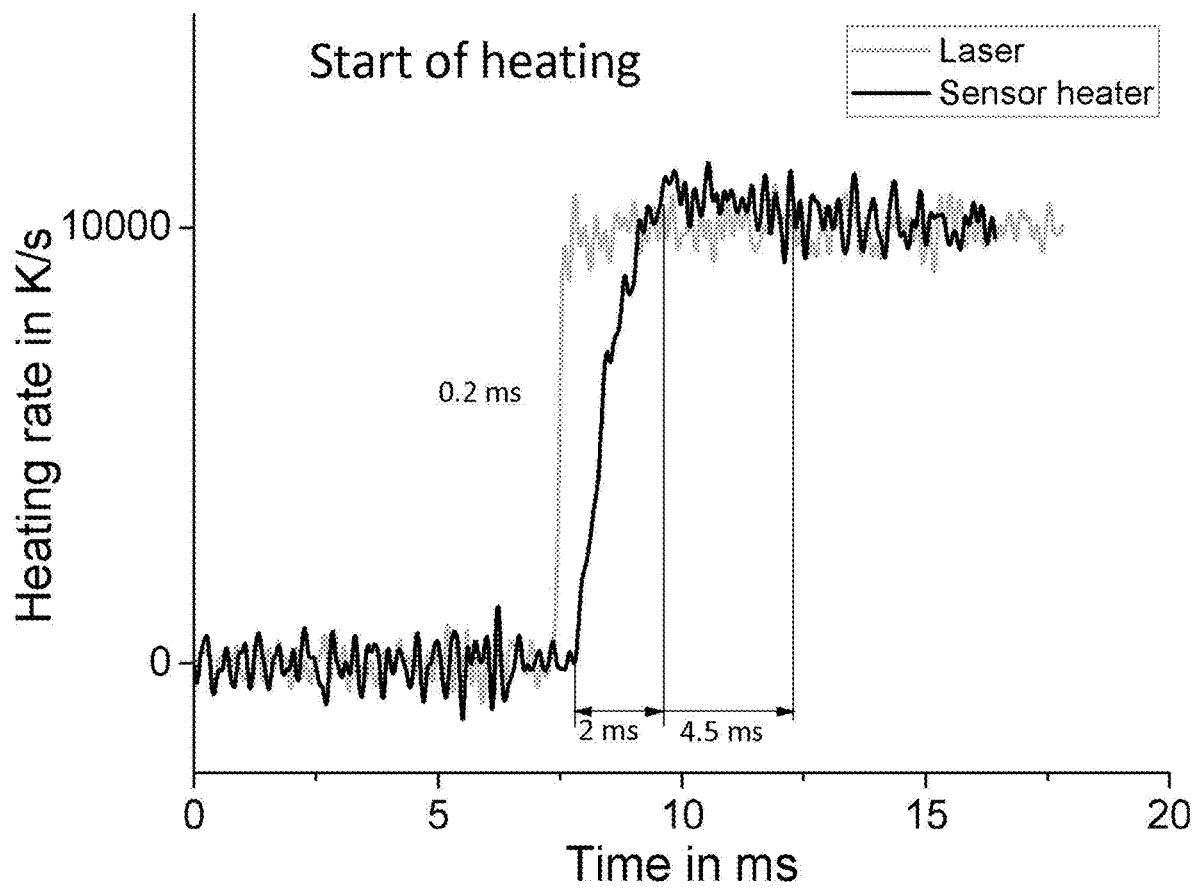
FIG. 4B is a curve of the heating starting process of the laser heating fast scanning calorimeter and a heater arranged in the sensor.

FIGS. 4A and 4B are graphs comparing the temperature control performance of laser heating and the heater arranged in the sensor. The temperature rising and dropping rate is 10,000 K/s, FIG. 4A is the actually measured temperature vs time curve, and FIG. 4B is a heating starting process. It can be seen from FIG. 4A that the response rate of the laser heating temperature control is fast enough to perform temperature compensation rapidly when the sample is melted and crystallized, so that the heating curve conforms to a set program, while the thermal lag exists between the heater arranged in the sensor (FIG. 4B) and the sample, and a significant temperature jump can be seen on the heating curve. It can be seen from FIG. 4B that the laser heating can complete temperature adjustment and stabilization within 0.2 ms, while the heater arranged in the sensor requires 2 ms to achieve temperature adjustment, and can complete overshoot to reach a stable temperature after 4.5 ms, and the temperature control response rate of the laser heating is about one order of magnitude faster than that of the heater arranged in the sensor.

The present invention provides a thought and a method for a laser heating single-sensor fast scanning calorimeter. Many methods and ways can be used for implementing the technical scheme, and the above description is only a preferred embodiment of the present invention. It is noted that, for those skilled in the art, a plurality of improvements and modifications can be made without departing from the principles of the present invention, and shall fall within the protection scope of the present invention. All unspecified components in the present example can be implemented by using existing technologies.

What is claimed is:

1. A laser heating single-sensor fast scanning calorimeter, comprising: an FSC sample chamber, a chip sensor positioned in the FSC sample chamber and used for loading a sample, a laser heater for heating the sample, an infrared camera for shooting a sample image, a communication terminal and a control electronic element;
   a perspective window serving as a light path channel is arranged in a center of the FSC sample chamber, and the laser heater and the infrared camera are positioned at a top of the perspective window and is capable of being aligned with the sample in the FSC sample chamber; and
   the infrared camera is connected with the communication terminal, and a shot picture is sent to the communication terminal through infrared imaging; one end of the control electronic element is connected with the communication terminal, and the other end of the control electronic element is connected with the laser heater and the chip sensor.

2. The laser heating single-sensor fast scanning calorimeter according to claim 1, wherein a PID temperature controller for outputting a heating power to the laser heater and a data acquisition card for recording real-time temperature values of the sample fed back by the chip sensor are arranged inside the control electronic element;
   one end of the PID temperature controller is connected with the communication terminal, and the other end of the PID temperature controller is connected with the laser heater; and
   one end of the data acquisition card is connected with the chip sensor; the other end of the data acquisition card is connected with the communication terminal.

3. The laser heating single-sensor fast scanning calorimeter according to claim 1, wherein the FSC sample chamber comprises a sealed cavity, a hot and cold stage positioned within the sealed cavity, and a PCB contact plate;
   the chip sensor is positioned above the hot and cold stage, the PCB contact plate is pressed on the chip sensor through an embedded metal pin, and a signal transmission is performed between the PCB contact plate and an FSC outside the sample chamber through a lead;
   a light path channel is reserved in centers of the hot and cold stage, the chip sensor and the PCB contact plate and corresponds to the perspective window;
   one end of the hot and cold stage is connected with a cold source outside the sample chamber through a pipeline, and the other end of the hot and cold stage is connected with an environment control device outside the sample chamber through a lead; and
   a gas inlet and a gas outlet are reserved on two sides of the sealed cavity, respectively.

4. The laser heating single-sensor fast scanning calorimeter according to claim 1, wherein a heater and a thermopile are arranged inside the chip sensor.

5. The laser heating single-sensor fast scanning calorimeter according to claim 1, wherein a front end of the laser heater is provided with a laser beam guide.

6. The laser heating single-sensor fast scanning calorimeter according to claim 1, wherein the infrared camera is equipped with a microscope lens.

7. A method for laser heating with the laser heating single-sensor fast scanning calorimeter according to claim 1, comprising:
   (1) installing the FSC sample room, the laser heater, the infrared camera, the communication terminal and the control electronic element;
   (2) placing an infrared display card at a sample loading position of the chip sensor in the FSC sample chamber, starting the laser heater for a laser radiation, observing a laser heating position through the infrared camera and adjusting a laser focusing until a laser point is brightest;
   (3) removing the infrared display card, loading a sample to be detected on the chip sensor, starting the laser heater for the laser radiation, finely adjusting a position of the sample to be detected according to a diameter and a thickness of the sample to be detected, and completing a laser position adjustment and the laser focusing; and
   (4) editing a required heat treatment process through the communication terminal, sending a temperature-time curve to the control electronic element in a voltage vs time form, driving, by the control electronic element, the laser heater to output a heating power according to a voltage vs time signal, meanwhile, receiving, by the control electronic element, sample real-time temperature values fed back by the chip sensor, and saving and sending the sample real-time temperature values to the communication terminal to be compared with a set temperature.

\* \* \* \* \*